(12) United States Patent
Fontana et al.

(10) Patent No.: US 6,902,068 B1
(45) Date of Patent: Jun. 7, 2005

(54) SUPPORTING FRAME FOR A CABINET OF AN ELECTRICAL PANEL

(75) Inventors: Rodolfo Fontana, Clivio (IT); Cristian Cagliani, Molteno (IT); Antonello Antoniazzi, Milan (IT)

(73) Assignee: ABB Services S.r.l., Milan (IT)

( * ) Notice: Subject to any disclaimer, the term of this patent is extended or adjusted under 35 U.S.C. 154(b) by 194 days.

(21) Appl. No.: 10/168,306

(22) PCT Filed: Nov. 8, 2000

(86) PCT No.: PCT/EP00/11243

§ 371 (c)(1),
(2), (4) Date: Oct. 9, 2002

(87) PCT Pub. No.: WO01/47080

PCT Pub. Date: Jun. 28, 2001

(30) Foreign Application Priority Data

Dec. 21, 1999 (IT) .......................................... MI99A2674

(51) Int. Cl.[7] .................................................. A47F 7/00
(52) U.S. Cl. ...................... 211/26; 211/189; 312/265.1; 312/257.1
(58) Field of Search .......................... 211/189, 26, 26.2, 211/192, 27; 312/265.1–265.6; 403/DIG. 11, DIG. 13, 170, 169, 178, 231, 292, 298, 326, 329, 361, 362

(56) References Cited

U.S. PATENT DOCUMENTS

| 3,087,768 | A | * | 4/1963 | Mack et al. ............. 312/265.4 |
|---|---|---|---|---|
| 3,603,628 | A | | 9/1971 | Smith et al. |
| 4,045,104 | A | * | 8/1977 | Peterson ................... 312/265.4 |
| 4,105,348 | A | * | 8/1978 | Anderson et al. ............ 403/172 |
| 4,431,331 | A | * | 2/1984 | Brody ......................... 403/189 |
| 4,678,359 | A | * | 7/1987 | Keen ........................... 403/170 |
| 5,144,780 | A | * | 9/1992 | Gieling et al. ............... 403/292 |
| RE34,393 | E | * | 9/1993 | McIlwraith ............... 312/265.4 |
| 5,516,225 | A | * | 5/1996 | Kvols .......................... 403/170 |
| 5,695,263 | A | * | 12/1997 | Simon et al. ............. 312/265.4 |
| 6,149,255 | A | * | 11/2000 | Benner et al. ........... 312/265.4 |
| 6,205,738 | B1 | * | 3/2001 | Chen ......................... 52/653.2 |
| 6,315,132 | B1 | * | 11/2001 | Hartel et al. .................. 211/26 |
| 6,413,004 | B1 | * | 7/2002 | Lin ............................. 403/176 |
| 6,419,331 | B2 | * | 7/2002 | Wei ......................... 312/265.1 |
| 6,592,285 | B1 | * | 7/2003 | Schwarz ..................... 403/179 |
| 6,634,510 | B2 | * | 10/2003 | Larson et al. .............. 211/41.8 |
| 2001/0037988 | A1 | * | 11/2001 | Knab et al. ................. 211/189 |
| 2002/0017839 | A1 | * | 2/2002 | Wei ......................... 312/265.1 |
| 2002/0171338 | A1 | * | 11/2002 | Wetterberg ............... 312/265.1 |

FOREIGN PATENT DOCUMENTS

DE    8528924 U1    12/1985

* cited by examiner

Primary Examiner—Carl D. Friedman
Assistant Examiner—Jennifer E. Novosad
(74) Attorney, Agent, or Firm—Connolly, Bove Lodge & Hutz LLP

(57) ABSTRACT

A supporting frame for a cabinet of an electrical panel has a first structural element and a second structural element with contoured bodies and which are mutually connectable. One of the structural elements includes engagement means for connecting the elements.

9 Claims, 4 Drawing Sheets

SUPPORTING FRAME FOR A CABINET OF AN ELECTRICAL PANEL

The present invention relates to a supporting frame for a cabinet of an electrical panel and to a cabinet which uses said frame; in particular, the present invention relates to a supporting frame for a cabinet of an electrical panel in which the structural elements that constitute the frame are conveniently configured so that their mutual connection occurs directly, according to a solution which stands out owing to its simplicity both in terms of production and in terms of practical use, allowing to facilitate assembly and reduce the costs entailed by its provision.

Generally, cabinets for low-voltage electrical panels are specifically designed and built so as to meet the functional and installation requirements of the components that constitute the panel. It is in fact known that electrical panels use a system of mutually parallel metallic bars, each of which is connected to a corresponding polarity of a power supply system. Inside the cabinet, the bars are electrically connected to the devices used in the panel, for example circuit breakers, and are geometrically coupled to appropriate insulation and support devices; said insulation and support devices, in addition to mutually electrically insulating the bars, allow to connect them to the structure of the cabinet. In this manner, any electrodynamic stresses produced by the flow of current in the bars are discharged onto the structure of the cabinet, which accordingly must have adequate structural strength characteristics. Furthermore, the electrical devices are arranged on one or more fixing guides, which are connected to the frame of the cabinet either directly or by using additional connecting elements. In order to meet these requirements, cabinets are generally provided with a structure shaped like a parallelepiped, inside which there is an adequate space suitable to accommodate the components of the panel and whose frame allows the anchoring of the elements that support said components, of the cladding panels and of the door of the cabinet.

In particular, the frame comprises two subframes which respectively constitute the lower and upper bases of the parallelepipedal structure; said subframes are typically constituted by four angular elements, generally known as three-way corner joints, which are mutually connected in pairs by virtue of profiled elements arranged substantially in a horizontal position and commonly known as cross-members. In turn, the subframes are mutually connected by using vertical profiled elements, or uprights, each of which connects two corresponding joints. Holes are furthermore provided along the vertical extension of the uprights for the direct fixing of the supporting elements of the electrical devices and of the distribution bars, or for the fixing of intermediate cross-members to which said supporting elements are connected.

In the current state of the art, the methods by which the various profiled elements of the frame are mutually connected are not fully satisfactory. The connection between the pairs of elements, for example a corner joint and a cross-member or an upright and a joint, in fact occurs by using a plurality of fixing screws, at least two for each coupling, so as to allow adequate connection and correct mutual positioning of the two elements.

These operations, owing to the number of profiled elements used and therefore to the large number of connections to be provided, require long execution times and a large number of fixing screws; furthermore, in view of the stresses, mainly shear stresses, to which the screws are subjected, said screws may break, consequently entailing a technical drawback.

It is also noted that at least two operators are required in order to correctly perform the connections, so that a first operator keeps the elements to be connected in the correct position and the second one actually produces the various connections; accordingly, the assembly and installation costs of the panel increase. Otherwise, i.e., if a single operator works, operations are very time-consuming and difficult to perform.

The aim of the present invention is to provide a supporting frame for a cabinet of an electrical panel in which the connection between the structural elements that constitute the frame occurs in a simplified manner with respect to known solutions, thus facilitating assembly and reducing its time requirements.

Within the scope of this aim, an object of the present invention is to provide a supporting frame for a cabinet of an electrical panel which is suitable for optimization of the use of the labor required for its production, with a consequent benefit in terms of costs.

Another object of the present invention is to provide a supporting frame for a cabinet of an electrical panel in which, with respect to known solutions, there is a drastic reduction in the additional fixing elements to be used, accordingly reducing the number of the corresponding fixing operations.

Another object of the present invention is to provide a supporting frame for a cabinet of an electrical panel in which there is an optimum distribution of the stresses to which the various connections are subjected, so as to avoid any mechanical failures while ensuring high strength of said connections.

Another object of the present invention is to provide a supporting frame for a cabinet of an electrical panel which is highly reliable, relatively easy to manufacture and at competitive costs.

This aim, these objects and others which will become apparent hereinafter are achieved by a supporting frame for a cabinet of an electrical panel, comprising at least one first structural element and one second structural element which have a contoured body and are meant to be mutually connected, characterized in that engagement means suitable to directly facilitate their mutual connection are formed on the contoured body of at least one of said first and second structural elements.

The supporting frame according to the invention therefore has the great advantage of comprising elements which are configured so as to integrate direct engagement means in their structure; with this solution, the connection among the structural elements that constitute the frame occurs without using additional fixing elements, typically screws, with significant advantages in terms of simplicity and speed of assembly and in terms of assembly costs.

Further characteristics and advantages of the invention will become apparent from the description of preferred but not exclusive embodiments of the supporting frame according to the invention, illustrated only by way of non-limitative example in the accompanying drawings, wherein.

In the description that follows, identical reference numerals designate identical or technically equivalent elements.

Figure 1:
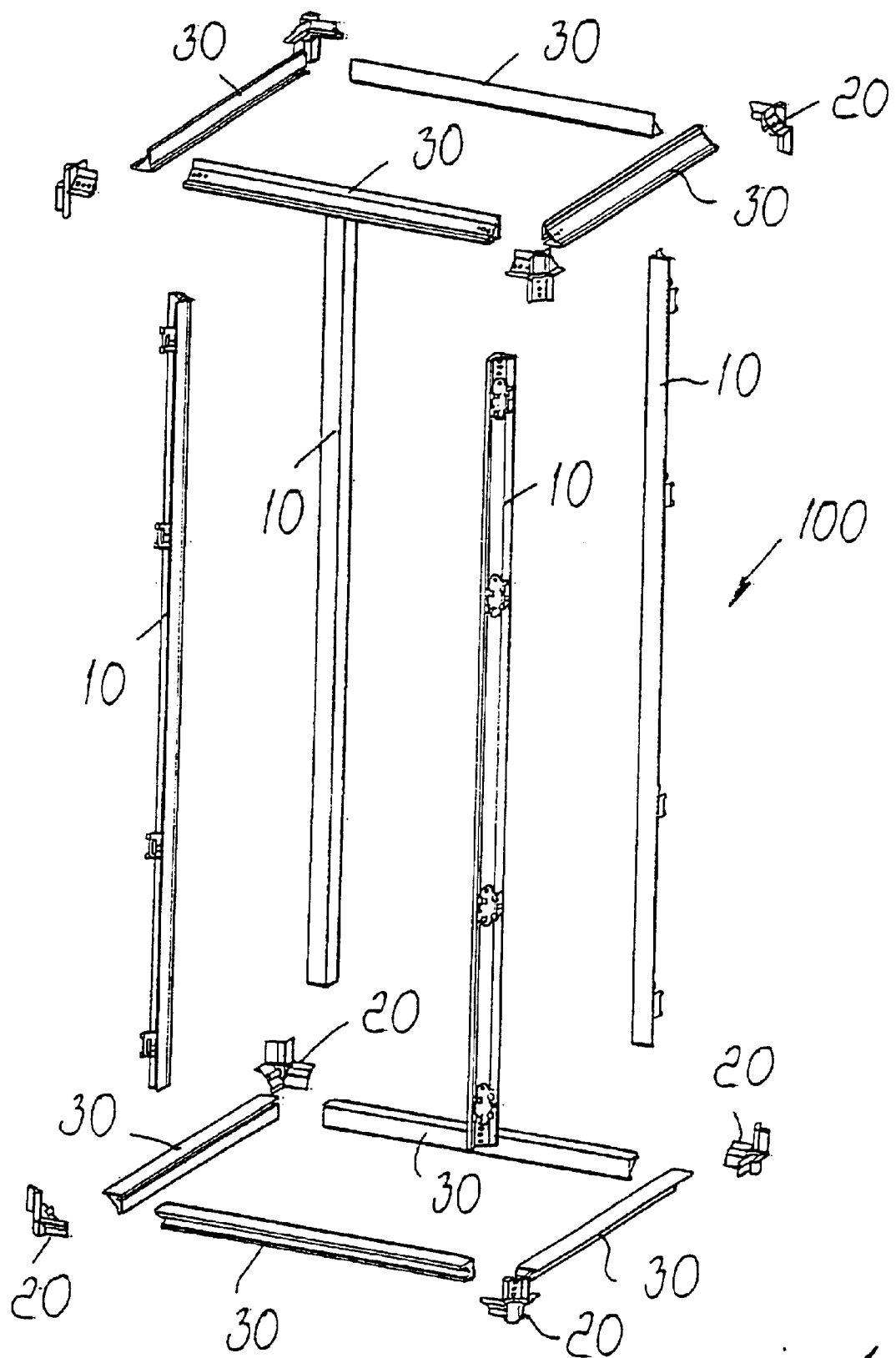
FIG. 1 is an exploded perspective view of a supporting frame for a cabinet of an electrical panel according to a known configuration.

FIG. 1 illustrates a supporting frame for a cabinet of an electrical panel, generally designated by the reference numeral 100. As shown in said figure, the frame 100 comprises a plurality of profiled elements which are substantially vertical and horizontal and are respectively constituted by uprights 10 and cross-members 30; each profiled element 10 or 30 connects a pair of corner joints 20 so as to provide a frame which is substantially shaped like a parallelepiped. Advantageously, in the embodiment of the frame according to the invention, in each pair of structural elements to be connected, for example a joint 20 and an upright 10, or a joint 20 and a cross-member 30, at least one first structural element has a contoured body on which there are engagement means which are suitable to directly facilitate, as described in detail hereinafter, the connection to the second structural element. In particular, the description that follows refers specifically to the connection between a corner joint 20 and an upright 10, but said reference is obviously to be considered merely as an example without intending to limit the scope of application in any way.

Figure 3:
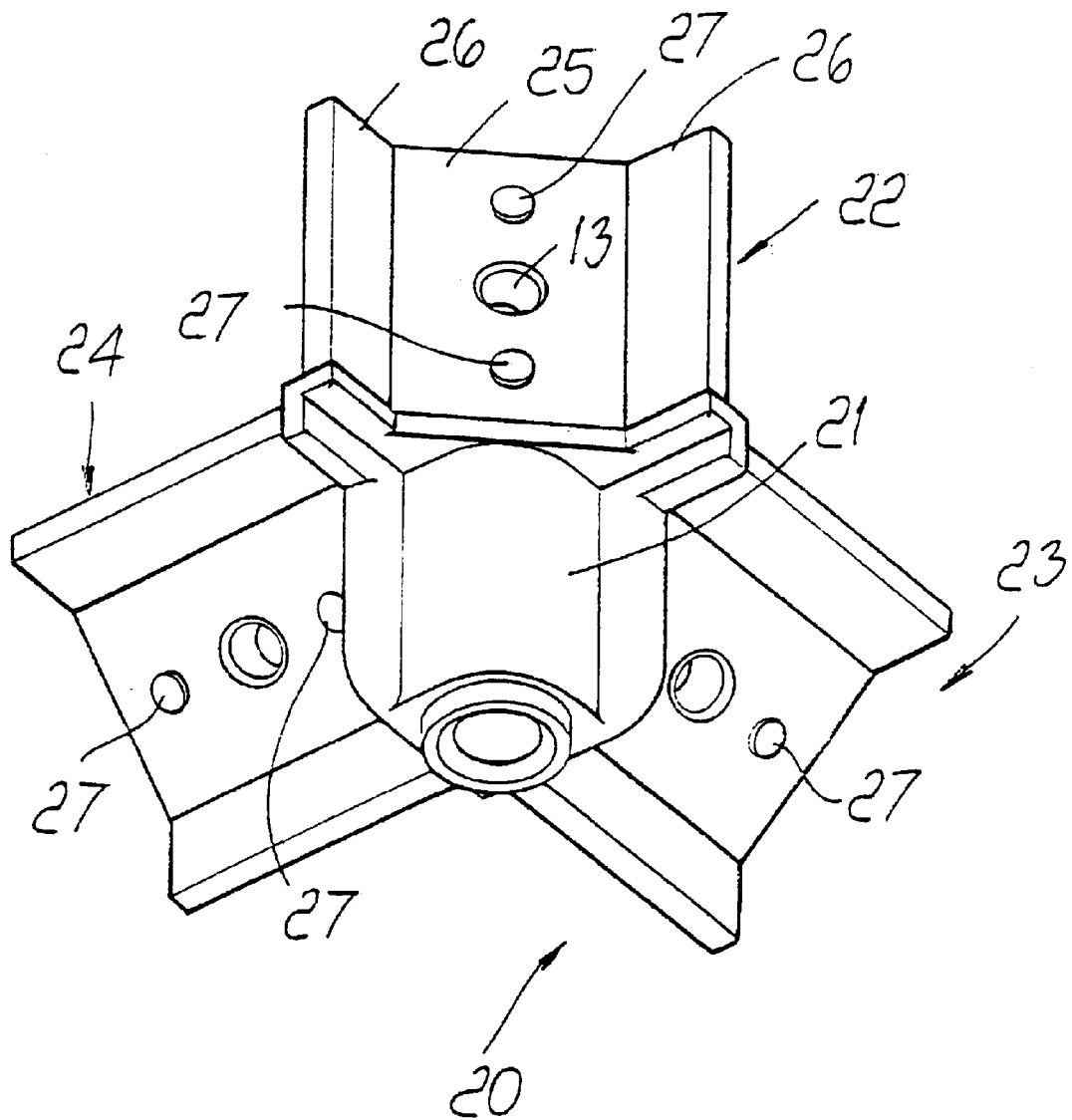
FIG. 3 is a perspective view of a detail of the corner joint used in FIG. 2.

An example of a corner joint 20 which can be used in the provision of a frame for a cabinet of an electrical panel is shown in detail in FIG. 3; in particular, the joint 20 has a central body 21 which is suitable to be rested on an abutment surface, for example a floor. Three profiled arms, designated by the reference numerals 22, 23 and 24 respectively, protrude from the main body 21 in three directions which are substantially perpendicular to each other; each arm has a substantially flat wall 25 from which two oblique walls 26 protrude in substantially mutually opposite directions, and said arms are suitable to facilitate connection to additional structural elements, for example the upright 10 itself and two cross-members 30.

Figure 2:
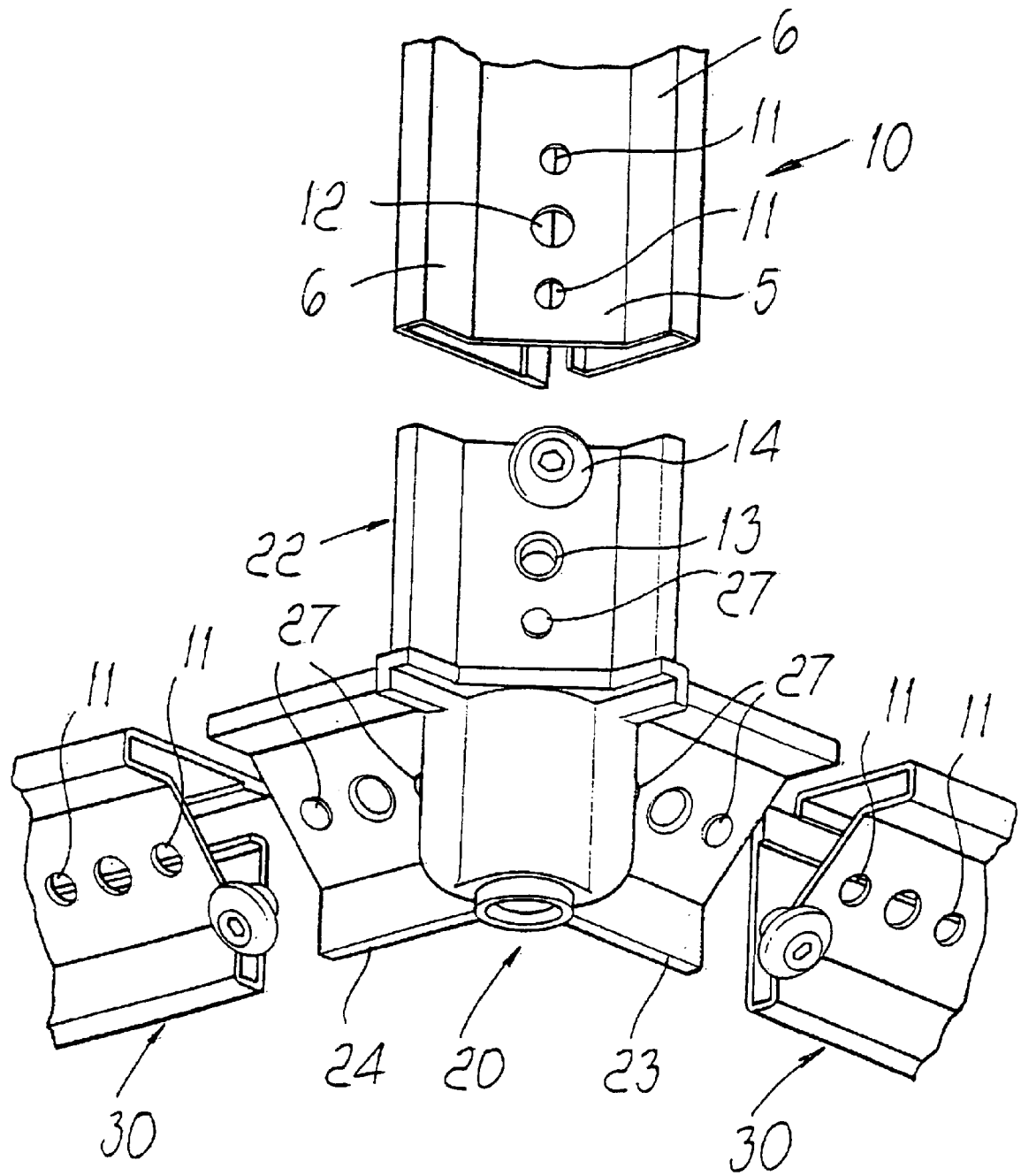
FIG. 2 is an exploded perspective view of a corner joint during coupling to an upright and two cross-members according to a preferred embodiment of the supporting frame according to the present invention.

An embodiment of the upright 10 which can be used in the frame according to the invention is described in detail in European patent application no. 98201165.2, whose description is to be assumed included herein by reference. In particular, as shown in FIG. 2, the upright 10 has a substantially flat wall 5 from which two oblique walls 6 protrude in substantially mutually opposite directions; the upright 10 furthermore has a hollow profiled body so as to form a seat which is suitable to accommodate an arm of the corner joint 20.

The corner joint 20 and the upright 10 can both be made of metallic or plastic material according to the various application requirements.

Figure 4:
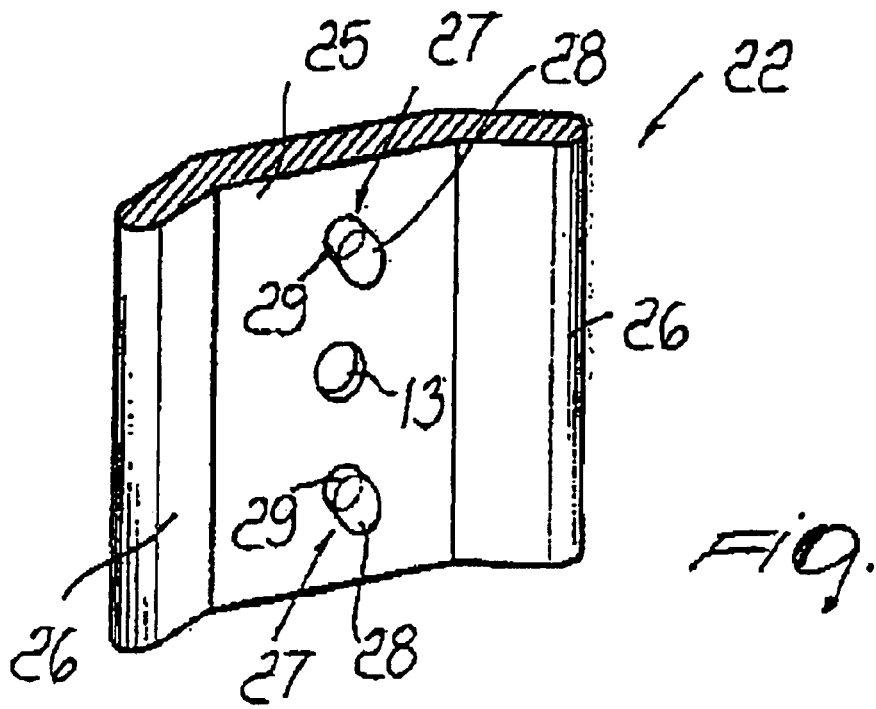
FIG. 4 is a schematic perspective view of the engagement means provided on the joint of FIG. 3.

Advantageously, in a preferred embodiment of the frame according to the invention, on the wall 25 of at least one arm of the joint 20 there is at least one protrusion 27 which protrudes at right angles to said wall 25 and is suitable to engage a corresponding hole 11 formed in the upright 10. As shown in detail in FIG. 4, the protrusion 27 is constituted by a body which has a substantially circular cross-section, for example a cylinder, which has a first base surface, which is fixed to the wall 25, and a second end surface 28, which lies opposite the base surface and protrudes substantially along a plane which is inclined with respect to said wall 25. In this manner, the lateral surface 29 that connects the base surface to the end surface 28 partially constitutes an abutment surface for at least one portion of the rim of a hole 11. In particular, in the embodiment of the joint shown in FIGS. 2 and 3, two protrusions 27 are formed on each wall 25 of the arms 22, 23 and 24, are mutually aligned along the longitudinal extension of the arm and are suitable to engage two corresponding holes 11 formed in the upright 10 and in the cross-members 30. With such a configuration, the stresses is that each connection has to withstand, mainly shearing stresses, are distributed along the contact surfaces that form between the walls of the protrusions 27 and the walls of the holes 11.

During assembly, the joint 20 is arranged so as to insert one of its arms, for example the arm 22, in the seat of the upright 10; when the upright 10 is fitted over the arm 22, the inclined surfaces 28 of the two protrusions 27 act as guides for the sliding of the upright and of the corresponding holes 11 until they enter said holes 11. In this situation, the lateral surface 29 of the protrusion, which connects the two end surfaces, acts as abutment element against which at least one portion of the rim of the corresponding hole 11 abuts. Accordingly, each hole 11 is practically engaged with the corresponding protrusion 27 with a solution which prevents the mutual disengagement of the two elements.

In this manner, one has a direct coupling between the structural elements which can be performed by a single operator in a very short time and without using additional fixing elements, such as for example screws, according to a solution which ensures optimum strength of the connection.

Evidently, the shape and arrangement of the protrusions 27 might be changed according to the various application requirements, for example by providing the protrusions on the upright and the holes in the joint, or by adopting protrusions whose cross-section is other than circular; furthermore, as shown schematically in FIG. 2, one might still provide for the use of a hole 12 in the upright and of a seat 13 in the joint in order to use an additional fixing screw 14, for example for security reasons.

Figure 5:
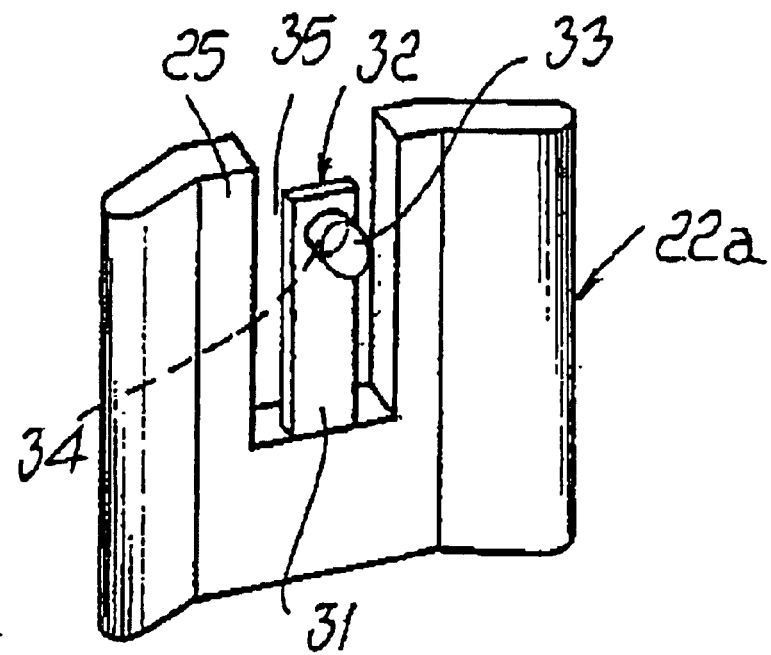
FIG. 5 is a schematic perspective view of a portion of a joint with engagement means according to a second embodiment of the frame according to the invention.

In an alternative embodiment, shown schematically in FIG. 5, at least one are of the joint 20, for eagle the arm 22a has a wall 25 with a cutout central portion 35 which is substantially U-shaped; in this case, the engagement means comprise at least one flexible tab 31 which protrudes from the base of the cutout portion 35 in a direction which is substantially parallel to the wall 25. The flexible tab 31 has an end portion 32 which is shaped so as to facilitate engagement with a corresponding seat formed in the upright 10. In particular, the contoured end 32 comprises a raised portion which has a circular cross-section and has a first base surface which is fixed to the tab 31 and an end surface 33 which lies opposite the base surface and lies substantially on a plane which is inclined with respect to the wall 25, with a shape which is similar to that of the previously described protrusion 27.

The two structural elements are mutually assembled in a manner similar to the one described above, by fitting the upright 10 over the arm of the joint 20, so that the tab 31 flus toward the wall 25 and facilitates, in cooperation with the inclined surface 33, the sliding of the upright; the opposite end 32 then enters the corresponding seat of the upright and the lateral surface 34 that connects the inclined surface 33 and the base surface which is fixed to the tab 31 acts as abutment for the edge of said seat. The flexibility of the tab 31 furthermore facilitates any uncoupling of the two components. As an alternative, the tab 31 might be shaped differently, for example U-shaped.

The above described solutions may be implemented in an equivalent manner with any component of the frame, for example for the connection between a corner joint 20 and a cross-member 30, in a manner which is fully similar to what has been described for the connection between the joint 20 and the upright 10; in this case, an element whose profile is substantially identical to the profile of the upright 10 can be used as cross-member, as shown in FIG. 2. In this manner, it is also possible to have a frame in which the three arms 22, 23 and 24 of a joint 20 are respectively connected to an upright 10, to a first cross-member and to a second cross-member in the manner described above.

In practice it has been found that the frame according to the invention fully achieves the intended aim and objects, since the connection between its structural elements occurs in a simplified manner with respect to the known art, with an optimized use of labor and a consequent benefit in financial terms; furthermore, the possibility to eliminate or at least drastically reduce the use of additional fixing elements allows to further reduce costs and provide faster assembly operations.

Attention is drawn to the fact that all the innovative functions and the inventive aspects of the frame can be obtained according to a solution which is advantageous from the point of view of production; if, for example, the joint is made of metallic material, the protrusion 27 or the tab 31 with the contoured end 32 can be obtained directly during the production of said joint or by performing a simple weld on the body of the joint. If instead the joint is made of plastics, for example by injection-molding, said elements might be formed directly by appropriately shaping the mold. In this case, the adoption of the cutout portion 35 would allow a considerable saving of material.

The frame thus conceived is susceptible of numerous modifications and variations, all of which are within the scope of the inventive concept; all the details may furthermore be replaced with other technically equivalent elements. In practice, the materials used, as well as the dimensions, may be any according to requirements and state of the art.

What is claimed is:

1. A supporting frame for a cabinet of an electrical panel, comprising:
    a plurality of corresponding corner joints, wherein the corner joints have:
        a central body and three profiled arms protruding therefrom, each arm having a substantially flat wall from which two oblique walls protrude; and
        protrusions extending from surfaces of the substantially flat walls of the arms;
    a plurality of uprights; and
    a plurality of cross members, wherein the uprights and cross members have:
        a substantially flat wall from which two oblique walls protrude; and
        a hollow profile body forming a seat suitable to accommodate an arm of a corresponding corner joint, wherein holes in the substantially flat walls of the uprights and cross members are suitable to engage the protrusions of the substantially flat walls of the arms of the corner joints when the arms are accommodated in a corresponding seat.

2. The supporting frame according to claim 1, wherein the protrusions comprise:
    a body having a substantially circular cross section and having a first base surface which is fixed to the substantially flat wall of an arm;
    a second surface, which lies opposite to the base surface substantially on a plane which is inclined with respect to the substantially flat wall of the arm; and
    a third surface for connection between the first and second surface, which forms an abutment for at least one portion of a rim of the holes in the substantially flat walls of the uprights and cross members.

3. The supporting frame according to claim 1, wherein the surfaces of the substantially flat walls of the arms have two protrusions suitable to engage two corresponding holes on the substantially flat walls of the uprights and cross members.

4. The supporting frame according to claim 1, wherein the surfaces of the substantially flat walls of the arms comprise:
    a base surface;
    a central U-shaped cutout; and
    at least one flexible tab protruding from the base surface in a direction which is substantially parallel to the substantially flat wall, the tab having an end which is shaped so as to enter a corresponding seat in the uprights and cross members.

5. The supporting frame according to claim 4, wherein the protrusions are positioned on the tabs.

6. A cabinet of an electrical panel comprising a supporting frame according to claim 1.

7. The cabinet according to claim 6, wherein the cabinet comprises four uprights and eight cross members interconnected with one another by eight corner joints.

8. The supporting frame according to claim 7, wherein the three arms extend substantially perpendicularly to one another.

9. The supporting frame according to claim 1, wherein the three arms extend substantially perpendicularly to one another.

* * * * *